UNITED STATES PATENT OFFICE.

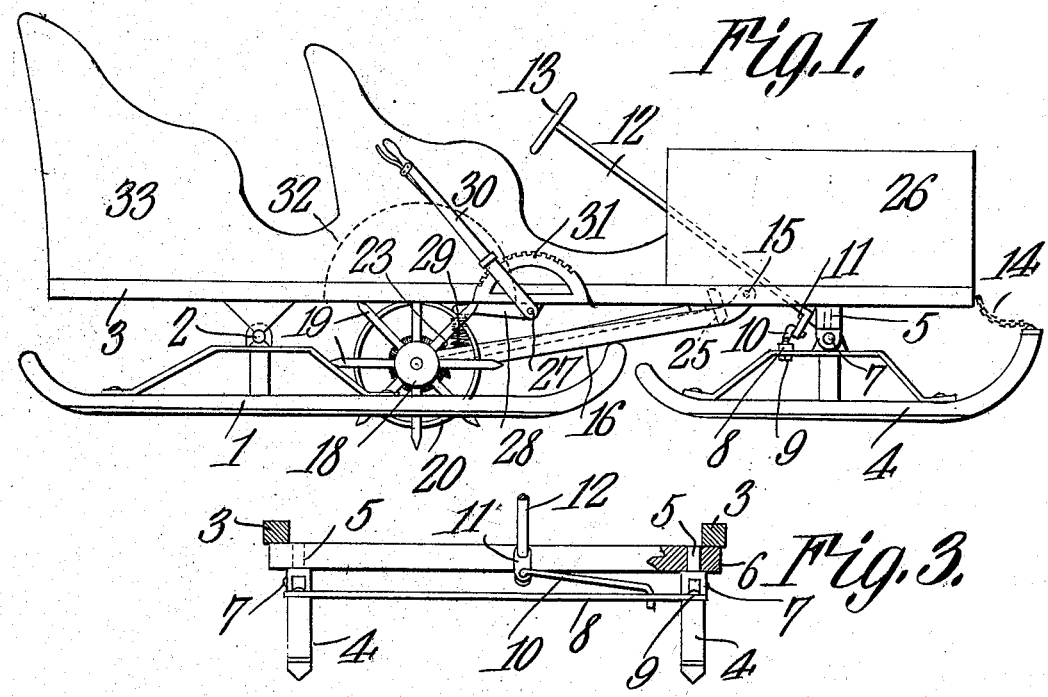
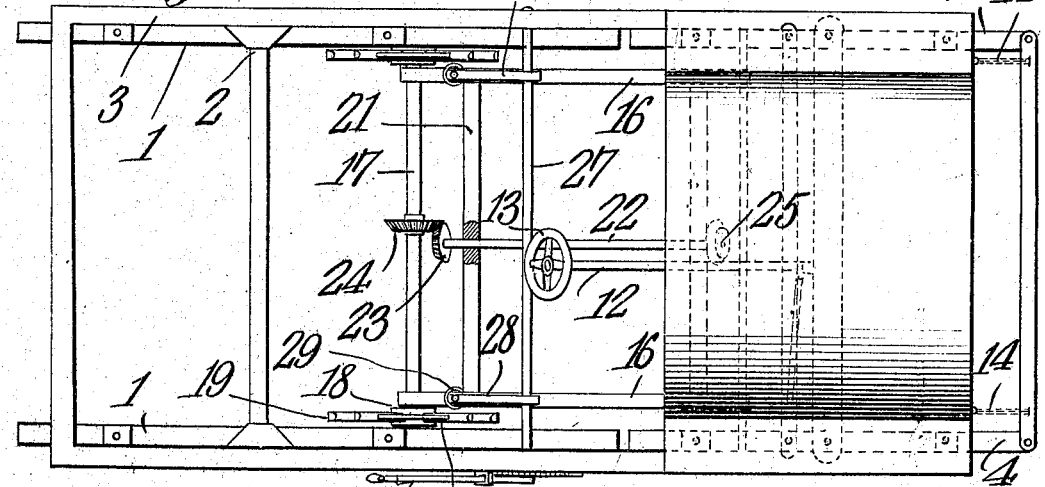

MATH TRUNT, OF MONTICELLO, MINNESOTA.

MOTOR-PROPELLED SLEIGH.

No. 905,251.     Specification of Letters Patent.     Patented Dec. 1, 1908.

Application filed May 7, 1907. Serial No. 372,328.

*To all whom it may concern:*

Be it known that I, MATH TRUNT, a citizen of the United States, residing at Monticello, in the county of Wright and State of Minnesota, have invented a new and useful Motor-Propelled Sleigh, of which the following is a specification.

This invention relates to motor propelled sleighs and its object is to provide a vehicle of this character having novel means whereby the same may be propelled over ice or snow, said means being under the positive control of the operator at all times.

A still further object is to provide a propelling device which will ride over uneven surfaces without affecting the movement of the vehicle, said propelling device being so disposed as to automatically adjust itself to the surface thereunder.

With these and other objects in view the invention consists of certain novel features of construction and combinations of parts which will be hereinafter more fully described and pointed out in the claim.

In the accompanying drawings is shown the preferred form of the invention.

In said drawings: Figure 1 is a side elevation of a sleigh embodying the present improvements; Fig. 2 is a plan view of the sleigh, the body thereof being removed; and Fig. 3 is a transverse section through a portion of the sleigh and showing the steering mechanism in rear elevation.

Referring to the figures by characters of reference, 1, 1 designate the two rear runners of the sleigh the same being pivotally connected as at 2 with the body 3 of the sleigh. These runners are disposed to rock independently upon the pivots 2 so as to ride easily over an uneven surface. The front runners 4 are pivotally connected to stems 5 disposed perpendicularly to the body 3 and mounted to rotate within a socket 6 depending from the body. It is thus apparent that each of the front runners is capable of swinging in a vertical plane upon its pivot 7 as well as in a horizontal plane with the stem 5 as a pivot.

Any suitable means may be employed for swinging the runners 4 laterally to guide the sleigh. In the drawings the two runners have been shown connected by a cross bar 8 pivoted to them as at 9 and connected by a link 10 with an arm 11 projecting from a stem 12. This stem is mounted to rock within the frame and has a steering wheel 13 at its upper end and within convenient reach of the operator. Obviously by turning the stem 12 in one direction the runners 4 can be swung laterally to turn the sleigh one way and by turning the stem 12 in the opposite direction this movement of the sleigh may be reversed. Chains 14 are preferably connected to the front ends of the runners 4 so as to limit the vertical and lateral movement thereof. All the runners are preferably triangular in cross section to prevent lateral slipping.

Trunnions 15 are journaled in the sides of frame 3 above the rear portions of runners 4 and these trunnions project laterally from arms 16 extending downwardly and rearwardly and having a shaft 17 journaled in their rear ends. A propelling wheel 18 is secured to each end of this shaft and close to the inner faces of the runners 1. Each of these wheels has fingers 19 projecting radially therefrom and held properly spaced by means of a ring 20 which extends through the fingers. The arms 16 are connected by cross strips 21 on which is journaled a shaft 22 having a gear 23 at one end meshing with a gear 24 on shaft 17. A gear 25 is disposed at the other end of the shaft and is designed to be actuated by suitable operating mechanism, not shown, and which is designed to be housed within a casing 26 upon the front portion of the frame 3. A shaft 27 is journaled within and extends transversely of the frame and has arms 28 extending therefrom and connected to the rear portions of the arms 16 by means of coiled springs 29. A lever 30 extends from one end of shaft 27 and is adapted to be locked in adjusted position by means of a toothed sector 31. A space such as designated at 32 is formed within the body 33 of the sleigh and above wheels 18 so that said wheels can be readily raised out of contact with the surface on which the runners rest.

As power is transmitted from the motor to gear 25 and as said gear is designed to move in an arc with the axes of the trunnions 15 it is obvious that the arms 16 can be swung so as to raise or lower the propelling wheels without interfering with the actuation of the wheels. This adjustment of the arms is effected by means of lever 30 and it is apparent that the sleigh can be quickly started or stopped simply by lowering the wheels into contact with the surface thereunder or by raising them above said surface respectively. As the centers of the wheels are disposed below the trunnions 15 it will be understood that the forward thrust by the wheels will tend to force them downward, thus insuring a firm grip upon the snow or ice at all times. The springs 29 are designed to exert a continuous downward pressure upon the arms 16 and wheels 18 so that said wheels will positively engage the surface thereunder and will ride over uneven surfaces or obstructions in the path of the wheels.

A vehicle such as herein described can be readily controlled and can be started or stopped without interfering with the operation of the motor simply by manipulating the propelling wheels 18. Importance is attached to the fact that these wheels are so positioned as to force themselves downward against the surface thereunder when exerting a forward thrust and that said wheels can automatically adapt themselves to any surface on which they may be mounted.

It is thought that the operation of the guiding mechanism will be apparent without the necessity of a detail description thereof. Although two propelling wheels have been shown it is to be understood that this number may be diminished or increased if desired without departing from the present invention.

What is claimed is:

A motor-propelled sleigh comprising a runner-supported body, arms pivotally connected to and extending rearwardly and downwardly from the front portion of the body, a transversely extending shaft journaled in the rear end portions of the arms, a propelling wheel upon each end of said shaft and close to the inner faces of the adjoining runners, radial fingers extending from each wheel, means movable vertically with the arms for transmitting motion from a motor upon the body to the transversely extending shaft, a transversely extending shaft journaled upon the body, arms thereon, springs for connecting said arms with the first mentioned arms, an actuating lever secured to the shaft upon the body, and means for locking said lever in adjusted position.

In testimony that I claim the foregoing as my own, I have hereto affixed my signature in the presence of two witnesses.

MATH TRUNT.

Witnesses:
MATT BARTHEL,
JOHN GOEB.